(12) United States Patent
Richter et al.

(10) Patent No.: US 7,861,431 B2
(45) Date of Patent: Jan. 4, 2011

(54) INJECTION MOLDING FIXING FOR FEELERS

(75) Inventors: Frank Richter, Heidenheim (DE); Thomas Frankenfeld, Schwäbisch Gmünd-Strassdorg (DE)

(73) Assignee: Carl Zeiss 3D Automation GmbH, Essingen b. Aalen (DE)

( * ) Notice: Subject to any disclaimer, the term of this patent is extended or adjusted under 35 U.S.C. 154(b) by 115 days.

(21) Appl. No.: 12/374,064

(22) PCT Filed: Jul. 26, 2007

(86) PCT No.: PCT/DE2007/001333

§ 371 (c)(1),
(2), (4) Date: Mar. 9, 2009

(87) PCT Pub. No.: WO2008/011878

PCT Pub. Date: Jan. 31, 2008

(65) Prior Publication Data
US 2010/0005674 A1    Jan. 14, 2010

(30) Foreign Application Priority Data
Jul. 27, 2006    (DE)    ........................ 10 2006 035 540

(51) Int. Cl.
*G01B 5/012*    (2006.01)

(52) U.S. Cl. .......................................... 33/503; 33/559
(58) Field of Classification Search ................... 33/503, 33/556, 559
See application file for complete search history.

(56) References Cited

U.S. PATENT DOCUMENTS

| 4,270,275 A | 6/1981 | McMurtry | |
|---|---|---|---|
| 4,523,063 A * | 6/1985 | Kroetsch | 33/561 |
| 4,553,001 A * | 11/1985 | Kroetsch | 33/561 |
| 2002/0145421 A1 | 10/2002 | Rose | |
| 2008/0148585 A1 * | 6/2008 | Raab et al. | 33/503 |

FOREIGN PATENT DOCUMENTS

| DE | 100 40 756 | 3/2002 |
|---|---|---|
| DE | 20 2005 003 217 | 6/2005 |
| EP | 1 024 341 | 8/2000 |
| WO | 95/22739 | 8/1995 |

OTHER PUBLICATIONS (*) = Foreign patent document with English language abstract.

* cited by examiner

*Primary Examiner*—G. Bradley Bennett
(74) *Attorney, Agent, or Firm*—Baker & Daniels LLP

(57) ABSTRACT

The invention relates to a feeler (1) having a shaft (2) and a coupling body (3) fixing the latter for coupling to a coordinate measuring device. It is provided here that the shaft is fixed in the receiving body by means of injection molding.

20 Claims, 1 Drawing Sheet

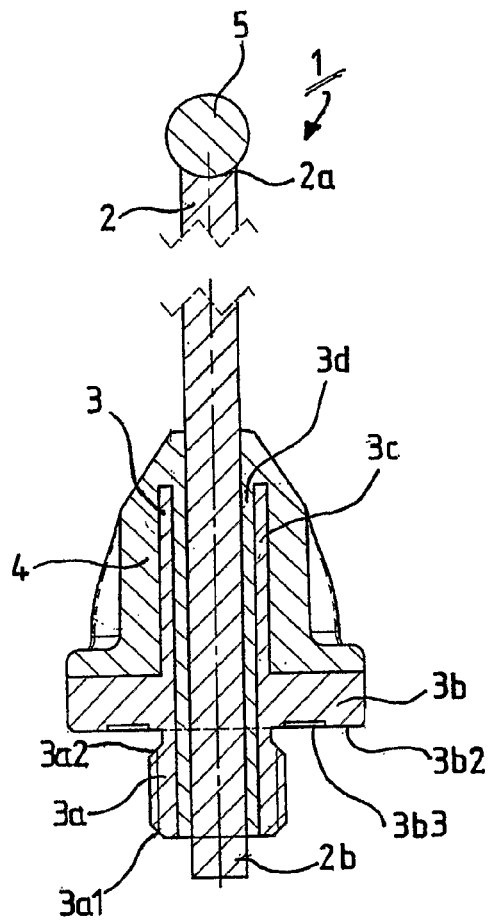
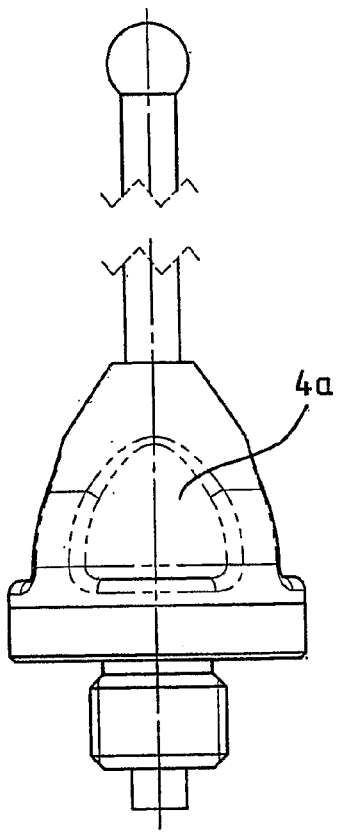
FIG. 1  FIG. 2
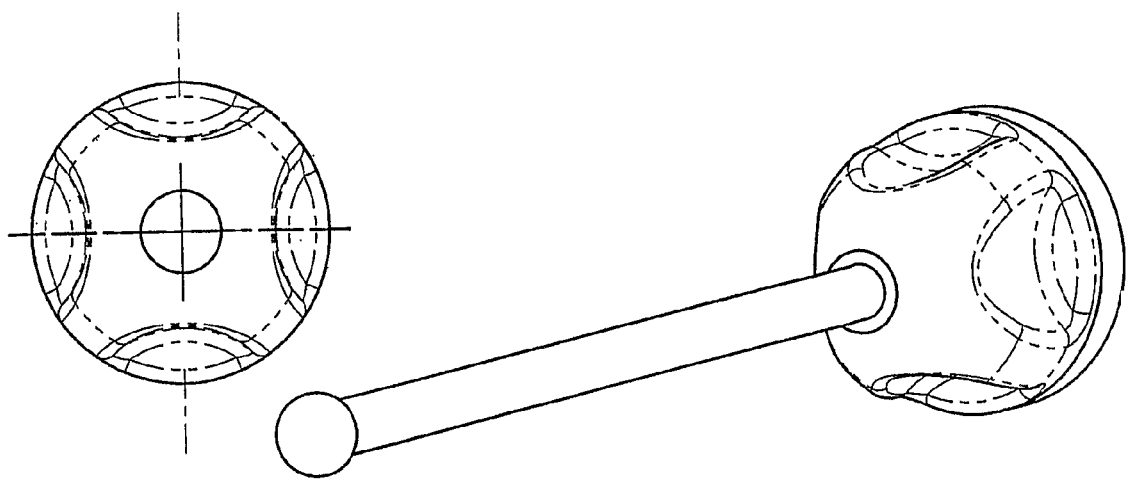
FIG. 3  FIG. 4

INJECTION MOLDING FIXING FOR FEELERS

CROSS-REFERENCE TO RELATED APPLICATION

This application is related to and claims the benefit under 35 U.S.C. §119 and 35 U.S.C. §365 of International Application No. PCT/DE2007/001333, filed Jul. 26, 2007.

The present invention relates to what is claimed in the preamble and is therefore concerned with feelers.

Feelers are required on coordinate measuring machines in order to scan a workpiece. To this end, the feeler is typically arranged on a movable arm of a coordinate measuring machine and is moved with the aid of the latter over the workpiece. If the feeler touches the workpiece to be measured with the aid of the coordinate measuring machine, a signal is generated from which it is possible to infer the variables to be measured.

In this method, the feeler is subject to a not inconsiderable wear, for example whenever it is moved in continuous contact ("in a scanning fashion") over the workpiece and is therefore subject to abrasion, or abraids material from the workpiece, that is to say is subject to attrition etc. The measuring accuracy is substantially impaired in such cases.

In order to obtain high accuracies with coordinate measuring machines, it is therefore necessary to replace the feelers regularly. The feeler itself therefore typically consists of a shaft on which the actual, typically spherical tip is fastened and used by the feeler to touch the workpiece to be measured, and of a coupling element that fixes the shaft and is directly or indirectly coupled to the arm of the coordinate measuring machine; an indirect coupling is required, for example, when adaptors are required in order to align the feeler at an angle to the arm, to provide extensions etc. In the present text, the term "coupling" always refers both to a direct coupling and to an indirect coupling as long as nothing else clearly emerges from the context or from explicit references.

Although the feeler is thus a wearing element that is to be exchanged regularly and to be as moderately priced as possible, there is nevertheless a need for high precision. In known feelers, the feeler is bonded into a holding element and must be carefully aligned to this end. This is a manual activity that is expensive.

The object of the present invention consists in providing something novel for commercial application.

This object is achieved in a way claimed independently; preferred embodiments are to be found in the subclaims.

The present invention therefore proposes in a first basic idea a feeler having a shaft and a coupling element, which fixes the latter, for coupling to a coordinate measuring machine, in which it is provided that the shaft is fixed in the holding element by injection molding.

A first essential aspect can thus be seen in the finding that the shaft can be fixed in the holding element by a highly automated fixing step that renders manual bonding and aligning operations dispensable, specifically by casting with hot plastic injection-molding compound. Surprisingly, it is possible in this case to attain high manufacturing accuracies, although injection-molding typically initially seems to question a very high precision and reproducibility of the fixing of the feeler owing to the high temperatures of the injection-molding compound to be enclosed, and to the thermal alternating loading associated therewith, as well as to the dynamic forces acting on the shaft and holding element. It is assumed that the good fixing which can be attained with injection molding is also conditioned by thermal effects of expansion and shrinkage, the holding body contracting more strongly after the cooling of the injection-molding compound than the geometrically smaller feeler surrounded by the holding body by being held therein. The attainable extraction forces are very high, irrespective of a possible loosening under normal environmental conditions. During operation, the behavior is then even improved by comparison with conventional arrangements. The reason for this is, firstly, the low mass of the holders, which allows high accelerations of a measuring arm without leading to torsional and bending loadings and resulting vibrations. In addition, the plastic compound damps vibrations of the feeler that can occur.

It is possible in principle to provide the shaft from different materials, for example from ceramic, carbon fibers or the like; however, the feeler is preferably produced with a shaft made from metal, in particular hard metal. It is also preferred in this case when the actual feeler tip is formed by a feeler ball that can, as usual, be ruby, star sapphire or another, sufficiently hard material; explicit reference may be made to the usefulness of diamond balls.

The coupling element can be formed, in principle, in a multiplicity of different ways. However, it is preferred when it has a holding bore into which the shaft can penetrate. This shaft-holding bore is preferably formed as a through bore or, with particular preference as a thin walled tube or the like, in particular. A thinness of wall is preferred and provided when, for example, a fixing clamping is co-effected by shrinking effects.

It may be pointed out that it would be possible, in principle, to produce the holding element in multipartite fashion for example, with half elements, by way of example, and to insert the shaft therein by assembly, or to form the holding element in another way. In a preferred variant, the shaft passes through the holding element, in particular through the through bore, and will project over the actual holding element. This has advantages in fabrication, because the shaft can then be fixed from two sides, that is to say both in front of the holding element and behind the holding element, while the injection molding is taking place.

The holding element can be formed in various ways in order to couple it to the coordinate measuring machine, for example with a bayonet lock, three-point bearings etc; however, it is preferred when the holding body has a thread with the aid of which it can be coupled to the coordinate measuring machine or to elements, such as extensions etc. connected therebetween. The thread would typically be an external thread, the counterthread being formed such that the shaft projecting over the holding element does not abut.

The thread would typically be surrounded by a stop plate or the like. It can thereby be ensured that the thread is turned into a holder up to a sufficient depth, and otherwise a correct alignment of the feeler is maintained relative to the coordinate measuring machine. It is preferred when the shaft is connected to the holding element not only in the region in front of and behind the holding element, but when plastic injection-molding compound is present between the actual shaft holder and the shaft, for example by a thin layer of plastic injection-molding compound in the holding element bore. Preference is given in this case to a layer thickness between 0.02 and 1 mm, preferably less than 1 mm. Layer thicknesses below 0.02 mm threaten the complete penetration of plastic injection-molding compound around the shaft in the holding element bore; however, it may be pointed out that the minimum layer thickness depends, inter alia, on the thermal capacity of the holding element, the injection temperature of the plastic injection molding compound, the viscosity, the injection pressure etc. Layer thicknesses of approximately 0.2 mm are preferred. Yet substantially larger layer thicknesses can lead to an oblique position of the shaft in the bore, the consequence of which can be an inexact alignment of the shaft in the feeler. Injection molding in a sleeve and, in particular, the clear space between sleeve and shaft has the advantage of fixing a very large area, and this contributes to holding the feeler securely. It may be pointed out that the shaft can be knurled in the region of the injection molding, and that it is also possible for the inner region of the holding bore to be made knurled, or not completely circular in cross section in some other way. This reduces the risk of the shaft being loosened by torsional loads. It may further be pointed out that other forms of the roughening or the like can likewise contribute to the shaft being more effectively fixed in the holding sleeve.

It is particularly preferred when there is simultaneously formed with the plastic compound a grip element with the aid of which the coupling element can easily be fitted on the coordinate measuring machine. The grip element will typically surround the sleeve or the like completely, and this contributes to its being heated during the injection molding, and thus can contribute to an improved fixing. This can even render unnecessary tools that are normally required in order to replace feelers on the coordinate measuring machine. This contributes to a further reduction in the operating costs, because it is thereby possible to accomplish the replacement more quickly. It may be pointed out that, if appropriate, the sleeves and/or the grip element can also be designed for engagement with a tool such as a wrench or the like, and this can, in particular, facilitate loosening of a feeler.

Protection is also claimed for a method for producing a feeler in the case of which a shaft is introduced into a holding element and again fixed thereon and/or therein by means of plastic injection molding.

The invention is described below only by way of example with the aid of the drawings, in which:

FIG. 1 shows a cross sectional view of a feeler of the present invention;

FIG. 2 shows a plan view of the feeler from the side;

FIG. 3 shows a plan view of the feeler from the tip; and

FIG. 4 shows a perspective view of the feeler.

According to FIG. 1, a feeler 1 denoted in general by 1 has a shaft 2 and a coupling element 3, fixing the latter, for coupling to a coordinate measuring machine (not shown), with the shaft 2 being fixed in the holding element 3 by injection-molding compound 4.

In the present exemplary embodiment, the feeler 1 serves to be fastened to a coordinate measuring machine in order to be able to perform highly accurate measurements of workpiece coordinates in a scanning fashion.

In the present exemplary embodiment, the shaft 2 is formed as preferred and possible from hard metal, but could also be formed from carbon fiber, carbon fiber composites or other materials. Provided on the tip pointing toward the workpiece in operation is a ball 5 made from a suitable material, in this case from ruby, that is connected in the usual way to the shaft 2, here by way of example by a complementary shaping at the shaft tip 2a and gluing the ball 5 in place by means of known adhesives; reference may be made to other possibilities of connection such as soldering. It may further be pointed out that the ball 5 can be fitted before or after provision of the injection-molding compound, and thus before or after formation of the fixing.

In the present case, the coupling element 3 is produced from tool steel, and exhibits toward the coordinate measuring machine a threaded attachment 3a that can, by way of example a be provided with a number of turns of an M5 thread, it being possible for the starting and end regions of the threaded attachment 3a to be beveled, compare 3a1, 3a2. The threaded attachment 3a is surrounded by an attachment 3b that extends far beyond the threaded attachment 3a in a radial direction, is therefore unipartite, and is provided for the purpose of stopping the holding element on a coordinate measuring machine after the thread 3a is screwed into a corresponding mating element with a flat stop surface 3b2 that otherwise has a depression 3b3 of annular shape toward the shaft such that the actual bearing of the holding element against the mating piece of the coordinate measuring machine takes place at a region lying far outside radially, and this leads to a more precise angular alignment of the feeler connected to the coordinate measuring machine in relation to the latter. In an axial direction, above the stop shoulder 3b the coupling element 3 continues with a tubular attachment 3c that is likewise integrated and formed in unipartite fashion. This tubular attachment 3c extends in the direction of the shaft 2 over approximately twice the length of the threaded element and stop plate. It is possible in principle for the tubular attachment 3c to be fashioned still longer, particularly whenever very long shafts 2 are used; however, this then necessitates other tools, possibly for longer shafts, for the injection molding, and the risk exists of the injection-molding compound 4 no longer completely penetrating into the clear region 3d between the shaft 2 and tubular attachment 3c. It may be mentioned that the unipartite nature of the coupling element with the tubular attachment and/or the threaded element is advantageous and preferred, but not mandatory.

As may be seen, the shaft 2 passes through the tube 3c and beyond the end thereof, and so it projects beyond the coupling element 3 on the side averted from the feeler ball 5. The projection 2b is at least so long that during the injection molding the shaft 2 can be effectively fixed in a mold such that no displacement takes place relative to the holding element 3. On the other hand, the shaft does not project rearward so far that it would impair the fastening of the holding element on the machine tool.

The injection-molding compound 4 is formed from conventional materials such as fiber filled plastics, and completely penetrates the clear region 3d between the inside of the holding tube 3c and/or the stop shoulder 3b and/or the threaded attachment 3a of the coupling element 3 and the shaft 2. Outside the holding tube 3c, the injection-molding compound 4 is shaped on the side of the stop plate 3b facing the feeler so as to facilitate an ergonomically easy grasping of the feeler, for which purpose, for example, cavities 4a are formed in the injection-molding shell around the tube 3c. The injection-molding shell is, furthermore, drawn out a little over the end of the tube 3c that faces the feeler or feeler ball 5, in order to protect this edge and surround it completely, something which favors the fixing by shrinking upon cooling.

The arrangement is produced as follows:

Firstly, a shaft 2 is supplied in which there is already provided the shaped area in order for the latter to be glued together later with a feeler ball on the tip. A coupling element 3 is also supplied. The shaft is plugged through the coupling element and brought together with the latter into an injection mold. In this process, the injection mold is used to attain an exact relative fixing of the coupling element 3 and shaft 2, specifically on the basis of the fixing of the shaft at both ends, the point being that the coupling element can be positioned in a defined fashion at regions, such as the thread, that are not injection molded, while the shaft is held at its ends. It is preferred in this process to do the fixing both at the front end and at the rear end of the shaft as well as at the coupling element 3.

Thereafter, plastic compound is injected at a high injection pressure and flows around the tube 3c and into the latter. The shaft is fixed on the holding element by setting of the plastic injection-molding compound, and the ball 5 can now be connected to the shaft.

It may be pointed out that it is possible in principle also to carry out the step of connecting the ball before the injection.

The invention claimed is:

1. A feeler having a shaft and a coupling element, which fixes the latter, for coupling to a coordinate measuring machine, characterized in that the shaft is fixed in the holding element by injection molding.

2. The feeler as claimed in claim 1, characterized in that the shaft is produced from metal, preferably hard metal.

3. The feeler as claimed in claim 1, characterized in that a feeler ball is provided on the shaft tip.

4. The feeler as claimed in claim 1, characterized in that the coupling element has a shaft-holding bore.

5. The feeler as claimed claim 4, characterized in that the shaft-holding bore is formed as a through-bore.

6. The feeler as claimed in claim 5, characterized in that the shaft passes through the holding element.

7. The feeler as claimed in claim 1, characterized in that the holding element has a thread for coupling to a coordinate measuring machine.

8. The feeler as claimed in claim 7, characterized in that the thread is surrounded by a stop plate.

9. The feeler as claimed in claim 1, characterized in that plastic injection-molding compound is present in a bore between the holding sleeve of the holding element and shaft, in particular with a layer thickness of on average between 0.02 and 1 mm, preferably approximately 0.1 to 0.4 mm, with particular preference a layer thickness of about 0.2 mm.

10. The feeler as claimed in claim 1, characterized in that the plastic injection-molding compound comprises a grip body for tightening the coupling element on the coordinate measuring machine.

11. A method for producing a feeler characterized in that a shaft is introduced into a holding element and fixed therein by means of plastic injection molding.

12. The feeler as claimed in claim 2, characterized in that a feeler ball is provided on the shaft tip.

13. The feeler as claimed in claim 12, characterized in that the coupling element has a shaft-holding bore.

14. The feeler as claimed in claim 2, characterized in that the coupling element has a shaft-holding bore.

15. The feeler as claimed in claim 3, characterized in that the coupling element has a shaft-holding bore.

16. The feeler as claimed in claim 2, characterized in that the holding element has a thread for coupling to a coordinate measuring machine.

17. The feeler as claimed in claim 3, characterized in that the holding element has a thread for coupling to a coordinate measuring machine.

18. The feeler as claimed in claim 4, characterized in that the holding element has a thread for coupling to a coordinate measuring machine.

19. The feeler as claimed in claim 5, characterized in that the holding element has a thread for coupling to a coordinate measuring machine.

20. The feeler as claimed in claim 2, characterized in that plastic injection-molding compound is present in a bore between the holding sleeve of the holding element and shaft, in particular with a layer thickness of on average between 0.02 and 1 mm, preferably approximately 0.1 to 0.4 mm, with particular preference a layer thickness of about 0.2 mm.

* * * * *